May 9, 1939.  F. ECKERT  2,157,819
BAIT FLOAT
Filed Jan. 25, 1938

INVENTOR
Frederick Eckert
BY
ATTORNEY

Patented May 9, 1939

2,157,819

UNITED STATES PATENT OFFICE 2,157,819

BAIT FLOAT

Frederick Eckert, New York, N. Y.

Application January 25, 1938, Serial No. 186,759

2 Claims. (Cl. 43—27)

This invention relates to new and useful improvements in a bait float.

More specifically the invention proposes the construction of a bait float characterized by a sinker attached to a fishing line, and a short length of flexible spring wire connected with the sinker and to which a float is attached for holding the piece of wire in a specific raised position.

Still further it is proposed to attach a snell having a fishing hook at one end to the raised end of the wire for keeping the same raised from the bottom of a body of water to prevent it from becoming entangled in grasses and weeds generally found in water.

Another object of this invention is to provide a means for assisting in holding the wire in an arcuate shape so as to suspend the snell and hook away from the line to permit it to wave freely in the water to attract passing fish.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
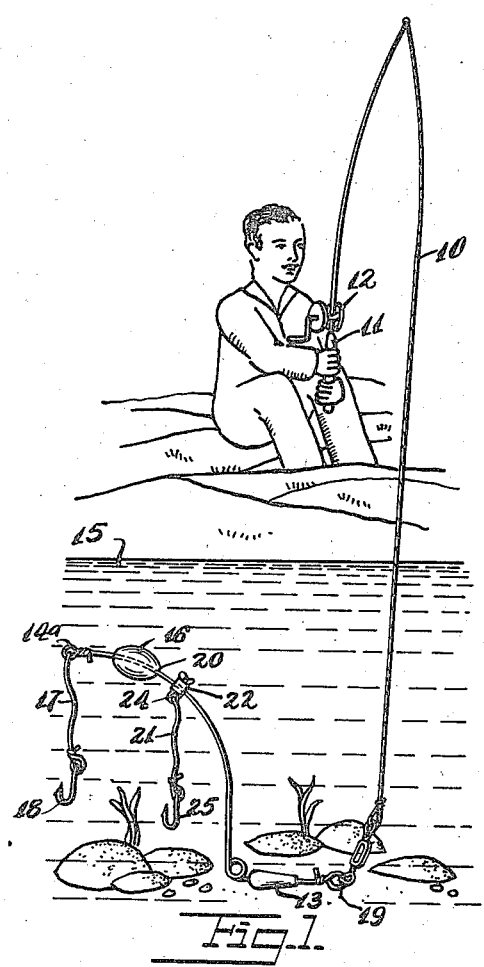
Fig. 1 is a perspective view of a fishing line having a bait float constructed according to this invention.
Figure 2:
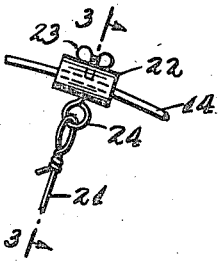
Fig. 2 is an enlarged detailed view of a portion of Fig. 1.
Figure 3:
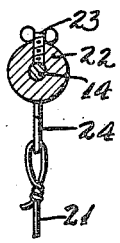
Fig. 3 is an enlarged sectional view on the line the line 3—3 of Fig. 2.

The bait float, according to this invention, is to be used in conjunction with a fishing line 10 which is attached to a fishing pole 11 having a conventional reel 12 for the fishing line. A sinker 13 has one of its ends attached to the end of the fishing line 10 and the other of its ends connected with a short length of flexible spring wire 14 which has a normal tendency to lay upon the bottom of a body of water 15. A float 16 is mounted on the flexible wire 14 intermediate of its ends and holds the wire in an arcuate upwardly extending position of the said bottom. A snell 17 having a hook 18 on one of its ends is secured to the free end of the piece of wire 14.

The sinker 13 is constructed of lead or any other heavy material and is provided at one of its ends with a loop 19 by which it is securely attached to the end of the fishing line 10. The piece of wire 14 is of arcuate shape and frictionally extends through an opening 20 formed in the float 16 which is constructed of cork or any other similar buoyant material. The wire 14 is provided at its free end with a loop portion 14ᵃ to which the free end of the snell 17 is securely tied. Another snell 21 may be adjustably attached to the piece of wire 14 between the float 16 and the end thereof which is attached to the sinker 13. The adjustable mounting of this snell 21 comprises a collar 22 which slidably engages over the wire 14 and which is provided with a set screw 23 which is adapted to engage against the wire 14 for adjustably supporting the collar 22 in various positions along the length of the wire 14.

An eyelet 24 is mounted on the collar 22 on the side opposite the set screw 23 and the snell 21 is adapted to be passed therethrough and securely attached therewith for supporting the snell 21 away from the wire 14. The other end of the snell 21 is provided with a hook 25. With this construction the hooks 18 and 25 will be suspended off the bottom of the water 15 and will be free of the wire 14 so as to wave in the water to attract the attention of passing fish.

Figure 4:
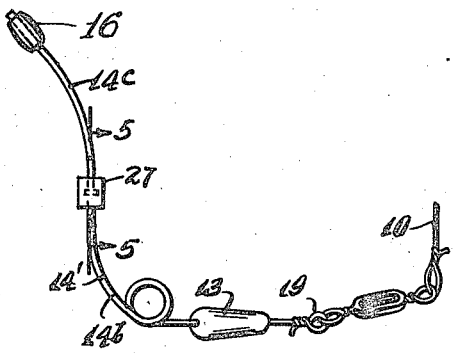
Fig. 4 is a view similar to a portion of Fig. 1 but illustrating a modification of the invention.
Figure 5:
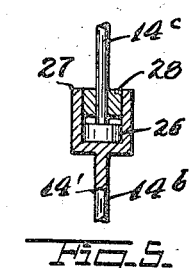
Fig. 5 is an enlarged sectional view on the line 5—5 of Fig. 4.

According to the modification shown in Figs. 4 and 5 the wire 14' consists of a bottom portion 14ᵇ and a top portion 14ᶜ and a means is provided for swivelly connecting these portions together so that they may turn to assume a position in which the top portion 14ᶜ will be in a parallel position with the flow of water 15 so that the hooks 18 and 25 will be suspended away from the wire 14'. This swivel connection consists of an enlarged head 26 formed on the end of the top section 14ᶜ and which is adapted to freely engage into a cup 27 formed on the bottom section 14ᵇ. A plug 28 slidably engages over the top section 14ᶜ and is adapted to be fixedly attached across the open end of the cup 27 for preventing the enlarged head 26 from sliding therefrom. In other respects this form of the invention is similar to the previous form.

Figure 6:
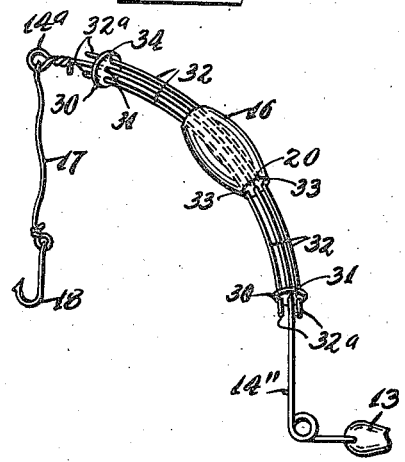
Fig. 6 is an enlarged perspective view of a bait float constructed according to a still further modification of the invention.

According to the modification shown in Fig. 6, a means is provided for assisting in holding the wire 14'' in its arcuate shape and consists of spaced discs 30 having openings 31 through which the wire 14'' is adapted to extend. Support wires 32 are adapted to frictionally pass through openings 33 formed in the float 16 and adapted to have their ends 32 frictionally pass through openings 34 formed in the discs 30 on opposite sides of the opening 31.

The support wires 32 are formed with the same arc as the wire 14'' and are adapted to assist in stiffening the wire 14'' for preventing the rushing water from bending the same to cause the hooks supported thereon to become entangled in the grasses found in the beds of rivers or other bodies of water. In other respects this form of the invention is similar to the previous forms.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A bait float comprising a fishing line a sinker weight attached to the end of the line for sinking to the bottom of a body of water containing fish, a short length of flexible spring wire attached to said weight to have a tendency to lay upon the bottom of said body of water, a float mounted on an intermediate area of said wire to slightly float and hold said wire in an arcuate upwardly extended position off the said bottom, and a snell with a hook secured upon a portion of said wire, and means for assisting in holding said wire in its arcuate shape.

2. A bait float comprising a fishing line, a sinker weight attached to the end of the line for sinking to the bottom of a body of water containing fish, a short length of flexible spring wire attached to said weight to have a tendency to lay upon the bottom of said body of water, a float mounted on an intermediate area of said wire to slightly float and hold said wire in an arcuate upwardly extended position off the said bottom, and a snell with a hook secured upon a portion of said wire, and means for assisting in holding said wire in its arcuate shape, said means comprising spaced discs securely attached on said wire and on opposite sides of said float, and support wires engaging through said discs and through said float for supporting said wire to prevent onrushing waters from bending said wire.

FREDERICK ECKERT.